May 30, 1967 L. J. TORDOFF 3,323,097
CONDUCTOR TERMINATION WITH STRESS DISTRIBUTION MEANS
Filed Aug. 17, 1964 2 Sheets-Sheet 2
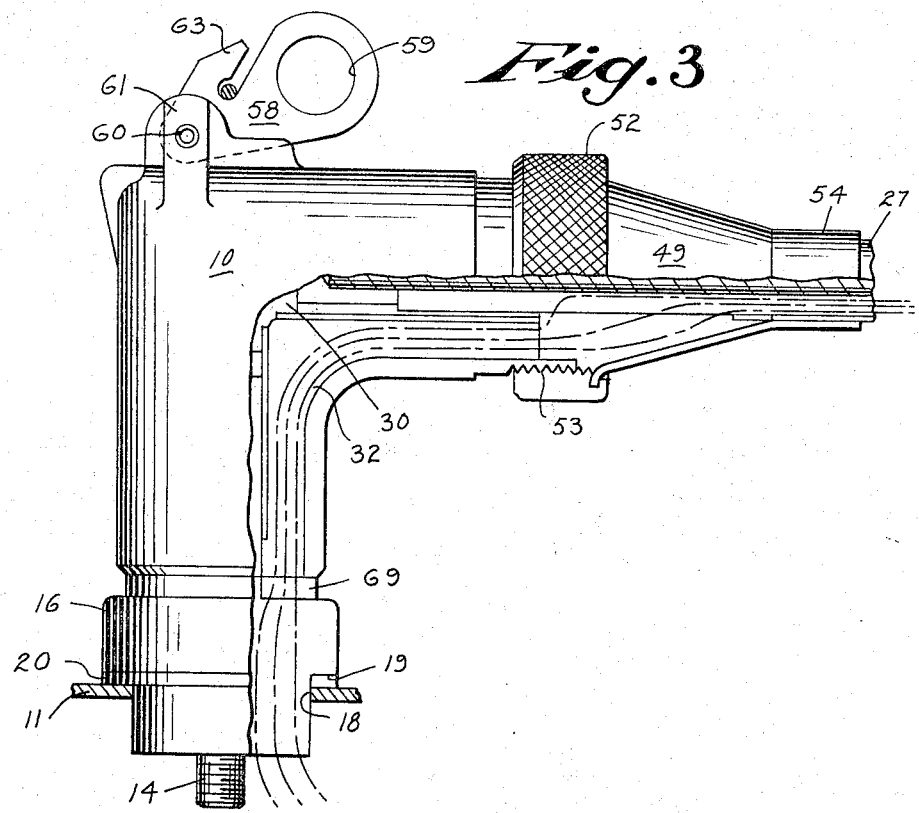
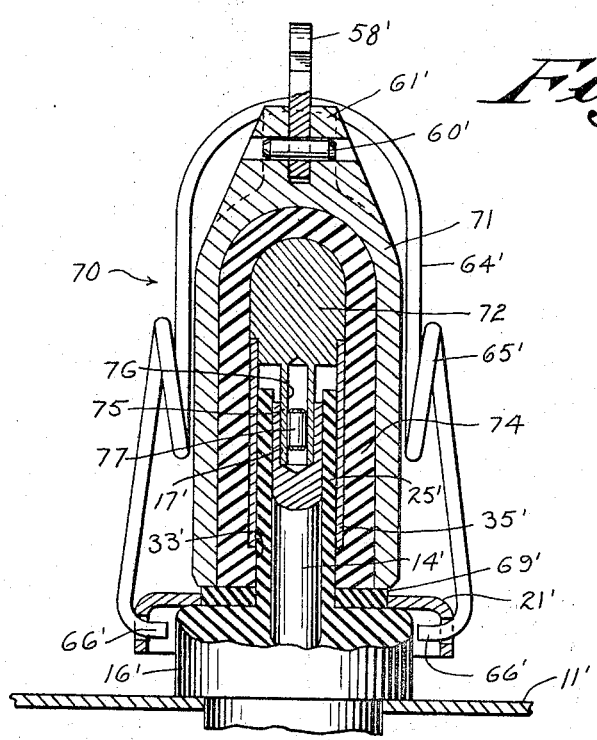
INVENTOR
Ledger J. Tordoff
BY
Lee H Kaiser
ATTORNEY

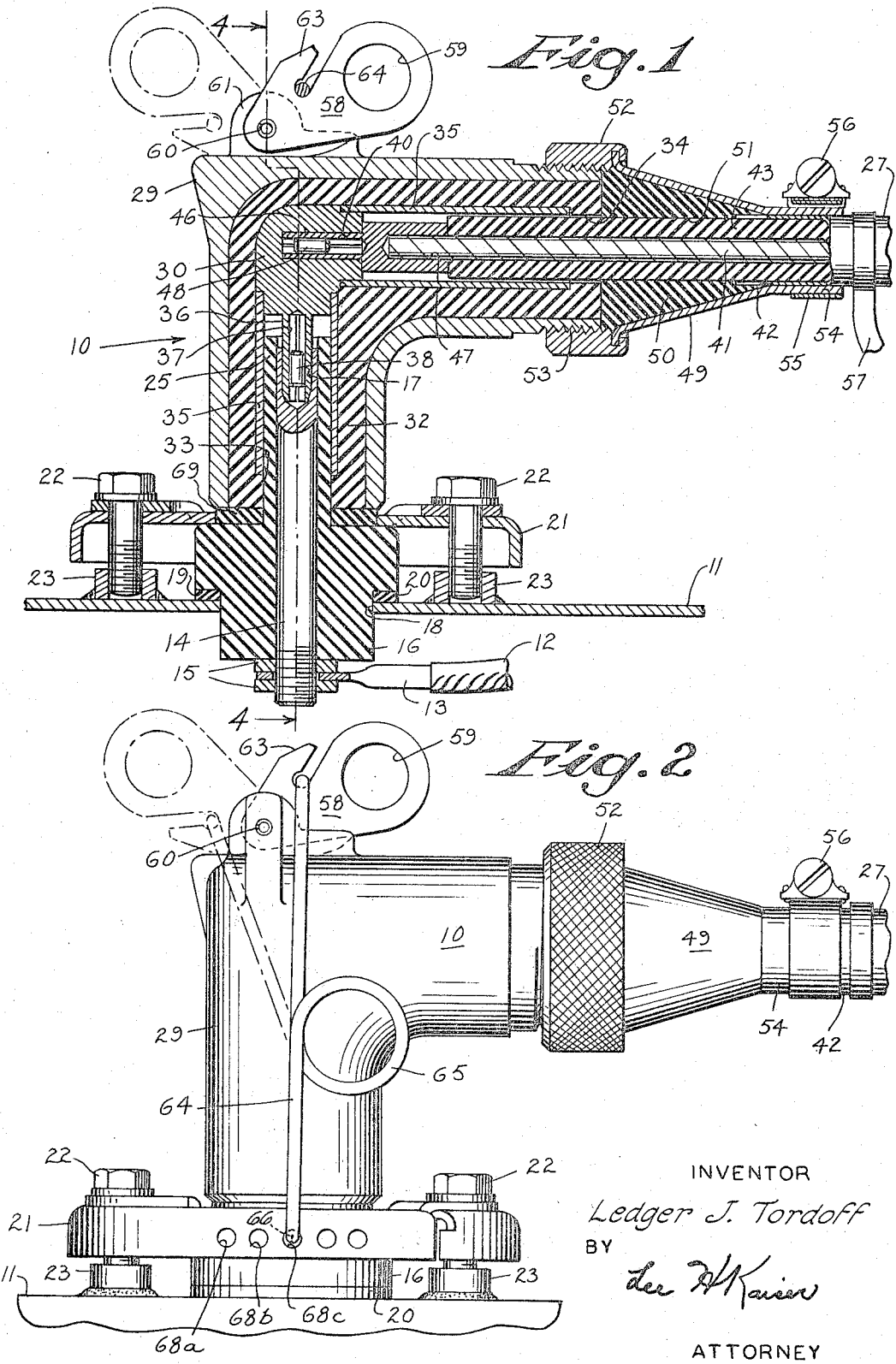

United States Patent Office 3,323,097
Patented May 30, 1967

3,323,097
CONDUCTOR TERMINATION WITH STRESS DISTRIBUTION MEANS
Ledger J. Tordoff, Milwaukee, Wis., assignor to McGraw-Edison Company, Milwaukee, Wis., a corporation of Delaware
Filed Aug. 17, 1964, Ser. No. 390,145
14 Claims. (Cl. 339—91)

This invention relates to end structures for high voltage conductors such as shielded cables and, in particular, to connectors and terminations for high voltage shielded cables.

Cables having a grounded conductive outer coating, or sheath, are used on electrical power distribution systems above 5 kilovolt rating to carry charging currents to ground, to protect personnel, and to prevent the generation of radio noise voltage. The electrical stresses in shielded type cables are radial in direction, and this eliminates the need to maintain high longitudinal dielectric strength in the cable insulation. The ground shield consists of a thin layer of conducting material immediately adjacent to the outermost layer of cable insulation which constitutes, in effect, an equipotential surface concentric with the axis of the conductor, and its presence causes the electric field distribution around the conductor to be radial, with zero gradients in the longitudinal direction of the cable. However, at the cable ends where the sheathing or metallic shield is removed from around the cable insulation, high longitudinal voltage gradients may occur. The ground shield must be removed sufficiently far back from the exposed cable conductor to prevent electrical breakdown of the adjacent air between the exposed conductor and the ground shield and to prevent creepage along the surface of the cable insulation between these points. This, however, results in excessive potential gradients near the terminal edge of the ground shield. Additional insulation and a generally bell-shaped extension to the ground shield, called a dielectric stress relief cone, are commonly used to minimize the longitudinal gradients on the cable surface at the end of the shielding. Such stress relief cones are commonly fabricated manually by wrapping turns of tape insulation and conductive tape into the shape of a double-ended cone. This construction transfers the termination shielding edge from the cable surface to the crest of the stress relief cone which is of increased diameter and thus increased dielectric strength. Such stress relief cones require considerable skill to construct and are time-consuming and expensive to fabricate and further they add considerably to the cost of a power distribution system which necessitates such a stress cone at each cable termination such as at each distribution transformer.

Stress cones are completely dependent upon the skill of the workman who winds the tape and are often unpredictable in their dielectric qualities because of air spaces, poor centering and lack of homogeneity of the insulating material. Further, they cannot be disconnected for system maintenance or fault isolation. When the atmosphere contains contaminates such as carbon, sulphur deposits, industrial waste, or salt, the surface of the stress relief cones may become eroded and contaminated to the point that tracking resistance is lowered, thereby requiring the use of a so-called pothead filled with an insulating compound to house the stress cone. Potheads are difficult to install and present a problem in obtaining void-free filling of the space between the porcelain body of the pothead and the cable termination structure. Such voids in the filling compound contain low pressure gas occlusions of low dielectric strength which become the initial points of ionization and consequent deterioration of the insulation. Stress cones and potheads do not permit disconnection of the cable for such purposes of allowing personnel to safely maintain or repair the electrical apparatus to which the cables are connected. Ionization of the air between mating parts at a cable joint due to electrical stress gives rise to corona and consequent deterioration of the insulation which restricts the use of connectors in shielded cables and necessitates elaborate and expensive arrangements such as capacitive grading means to control the voltage gradients at cable joints and terminations.

It is an object of the invention to provide an improved high voltage shielded cable termination which eliminates porcelain potheads and manually fabricated stress cones and yet has high dielectric and creep strength and does not generate radio interference voltage or introduce danger of deterioration of the electrical insulation. It is a further object of the invention to provide a termination for a high voltage conductor which removes electrical stress from all air in the termination and confines the electric field to insulating material molded at the factory between an electrically energized, or "hot," inner electrode and the grounded shield surrounding it. Another object is to provide a shielded cable termination which removes electrical stress from all air in the termination and has prefabricated, dielectric stress relief means which are quickly and easily assembled to the cable in the field. A still further object of the invention is to provide such a shielded cable termination which has a continuous grounded shield that reduces the possibility of carbon tracking due to electrical stress and reduces hazards to workers so that indoor installation is possible. Still another object is to provide such a cable termination which has prefabricated stress relief means and is completely weatherproof and capable of direct burial in the ground or submersion in water.

An object of a preferred embodiment of the invention is to provide a connector for a shielded cable which removes electrical stress from all air adjacent the male and female connector parts and may be easily installed and disconnected by a hookstick. Another object of the preferred embodiment is to provide such a connector for a shielded cable which forms a completely shielded and grounded connection that resists exposure to the atmosphere and is capable of direct burial and even immersion in water. Still another object of the preferred embodiment is to provide such a shielded cable connector which has prefabricated stress relief means that are easily and quickly assembled to the cable in the field and may be either of the straight-through type or the elbow type permitting a right angle connection from cable to electrical apparatus. Still another object is to provide such a disconnectable termination for a shielded cable which allows greatly reduced dimensions of a vault or ground level transformer enclosure and makes possible a dead front transformer entrance with a visible disconnect and cable grounding point. A still further object is to provide a disconnectable joint between a shielded cable and an electrical apparatus insulating bushing which removes electric stress from all air in the joint, provides weatherproof seals to the bushing and cable, and has a continuous ground shield.

These and other objects and advantages of the invention will be more readily apparent from the following detailed description when taken in conjunction with the accompanying drawing wherein:

FIG. 1 is a sectional view through a preferred embodiment of the invention;

FIG. 2 is a front view of the embodiment of FIG. 1;

FIG. 3 is a view similar to FIG. 1 schematically illustrating the voltage gradient pattern in the cable termination; and FIG. 4 is a sectional view through an alternative embodiment of the invention.

Referring to FIGS. 1–3 of the drawing, the invention is illustrated as embodied in an elbow connector 10 for shielded cable which may be quickly and easily disconnected from high voltage electrical apparatus (not shown) housed in a metallic casing 11 and having a primary conductor 12 crimped or swaged to a metallic terminal 13 provided with an eye which fits over the threaded end of a conductor stud 14 within the casing 11 and is secured thereto by nuts 15. Conductor stud 14 is molded within a bushing 16 of suitable insulating material such as epoxy resin or silicone rubber and extends outward from the apparatus casing 11 and terminates in an axial bore 17 which constitutes the female member, or receptacle, of the connector. Insulating bushing 16 extends through an aperture 18 in a wall of casing 11 and has an enlarged diameter portion forming a shoulder 19 disposed against the exterior of the casing wall 11 with a resilient gasket 20 compressed therebetween to provide a hermetic seal for casing 11 at aperture 18. A split type clamp 21 is disposed against the larger diameter portion of insulating bushing 16 and has clearance apertures therein which receive clamping bolts 22 engaged within internally threaded bosses 23 welded to the exterior of casing 11 to rigidly affix insulating bushing 16 to casing 11 and compress gasket 20. Insulating bushing 16 has a tubular portion 25 surrounding conductive stud 14 and extending beyond the end thereof to insure that no metallic "live" parts are exposed when the cable is disconnected from the electrical apparatus and to make possible a dead front apparatus entrance.

The elbow connector 10 of the invention permits making a right angle connection from a shielded high voltage cable 27 to the electrical apparatus. Connector 10 includes an outer tubular body member 29 of suitable metal such as aluminum with a right angle bend therein. Body portion 29 surrounds an interchange connector 30 of high conductivity material such as copper disposed within body member 29 adjacent the bend therein and in spaced relation to the inner walls of body member 29. A suitable insulating material having high dielectric strength and high surface resistivity such as silicone rubber is poured within body member 29 at the factory and cured therein to form a tubular insulating member 32 between body member 29 and interchange connector 30. Body member 29 and tubular member 32 thus have perpendicular straight arm portions, and the axial opening in tubular member 32 defines axial apertures 33 and 34 in such arm portions through which the interchange connector 30 is accessible. Interchange connector 30 has reduced diameter portions adjacent its ends over which conductive sleeve shields 35 fit, and shields 35 are molded within the tubular insulation 32 and define the inner periphery of the axial apertures 33 and 34 for most of the length thereof. Tubular portion 25 of insulating bushing 16 fits snugly within aperture 33 and sleeve shield 35. Interchange connector 30 has a bayonet connector portion 36 within axial aperture 33 adapted to slidably fit within the receptacle 17 of insulating bushing 16 on the electrical apparatus. Male connector portion 36 has an axial bore 37 and is split longitudinally at diametrically opposed points, and a pin 38 of slightly larger diameter than axial bore 37 is disposed within axial bore 37 and urges the split portions of bayonet 36 outward into high pressure engagement with the receptacle 17. Interchange connector 30 also has an opening 40 accessible through axial aperture 34 which constitutes a female connector portion, or receptacle, for connection to the conductor 41 of shielded cable 27.

In the field, the conductive shield 42 is stripped back for a predetermined length on shielded cable 27, the cable insulation 43 is removed a short distance to expose a short length of the cable conductor 41, and a metallic bayonet connector member 46 having an aperture 47 in one end thereof adapted to receive cable conductor 41 is crimped, or swagged, to cable conductor 41. The other end of bayonet 46 is split longitudinally and has an axial bore therein in the same manner as described for bayonet 36, and a pin 48 of slightly larger diameter than the axial bore urges the split portions of bayonet 46 outward into high pressure engagement with the wall portions of interchange connector 30 which define opening 40. A prefabricated, metallic dielectric stress relief member 49 of frustoconical shape and a sealing member 50 of frustoconical shape complementary to member 49 and of suitable high dielectric strength and high surface resistivity insulating material such as silicone rubber are then inserted over cable 27, and the bayonet 46 is inserted through aperture 34 into the opening 40 in interchange connector 30. The cable insulation 43 fits snugly within aperture 34 and in the axial opening 51 in frustoconical sealing member 50. Sealing member 50 is of the same material as tubular insulating member 32, and in alternative embodiments of the invention the frustoconical member 50 is molded integrally with body member 32 by capping body member 29 with a frustoconical die (not shown) before the silicone rubber is flowed into body member 29. The larger diameter end of stress relief member 49 is crimped to an internally threaded metallic collar 52 which may then be manually engaged with external threads 53 on body member 29. Tightening of collar 52 compresses frustoconical insulating member 50 against the end of tubular member 32 and against the cable insulation 43 to hermetically seal the cable termination.

Stress cone 49 includes a tubular extension 54 adjacent its smaller diameter end in surrounding relation to the conductive shield 42 on the cable 27, and a suitable compression clamp 55 is placed around tubular portion 54 and tightened by screw fastening means 56 to clamp the tubular portion 54 in mechanical and electrical engagement with the cable shield 42. It will be appreciated that stress cone 49 forms an increased diameter extension of the grounded cable shield 42 and prevents concentration of lines of electrical force at the end of the cable shield 27. FIG. 3 illustrates that substantially zero potential gradients exist in a longitudinal direction throughout the entire length of the connector. A suitable ground strap 57 of conductive material may be electrically connected to the cable shield 42 and to ground and to the apparatus casing 1 (not shown).

A hookstick latch 58 having an eye 59 adapted to receive a hookstick is pivoted on a pin 60 extending through spaced apart ears 61 on the body portion 29 adjacent the bend therein. Latch 58 has a hook portion 63 adapted to engage the bight of a generally U-shaped toggle spring 64 having a loop 65 in each leg thereof and inwardly bent ends 66 adapted to fit within any of a plurality of pairs of diametrically opposed holes 68a, 68b, 68c in the split clamp 21. The holes 68 permit any desired orientation of the cable relative to the electrical apparatus, and it will be appreciated that the elbow connector 10 allows greatly reduced dimensions for an apparatus enclosure such as a transformer vault or ground level transformer. Latch 58 has a latching position, shown in full lines in FIG. 2, wherein toggle spring 64 is in an overcenter position and the toggle spring 64 is tensioned, thereby preventing removal of elbow connector 10 from insulating bushing 16 and compressing an annular gasket 69, of suitable high dielectric strength and high surface resistivity insulating material such as silicone resin between insulating bushing 16 and the elbow connector 10, whereby a weatherproof seal is provided for the mating bayonet 36 and receptacle 17 of the connector. Latch 58 may be operated by a hookstick to a released position, shown in dotted lines in FIG. 2, wherein toggle spring 64 is released and does not obstruct removal of elbow connector 10 from insulating bushing 16. When latch 58 is in the released position, a pull on a hookstick engaged within eye 59 will actuate the elbow connector 10 away from the electrical apparatus casing 11 and disengage bayonet 36 on interchange connector 30 from female connector portion 17 of the insulating bushing 16 to thus electrically disconnect the cable conductor 41 from the electrical apparatus.

Shields 35 are at the voltage of the cable conductor 41 but are insulated from the grounded metallic body portion 29 by the tubular insulating body 32 in which the shields 35 are embedded. It will be appreciated that the voltage gradients are in a radial direction between the concentric "hot" shields 35 and the surrounding grounded body portion 29; the equipotential lines of the electric field are substantially parallel to the cable conductor as schematically illustrated in FIG. 3; and consequently none of the air within the shield 35 is subject to electrical stress and will not be ionized or give rise to radio noise voltage or generate corona which would initiate deterioration or breakdown of the cable insulation. The toggle spring 64 completes the grounding path between the body portion 29 and the electrical apparatus casing 10 and thus assures a continuous grounded sheath for the connector. The shield 35 is recessed within the axial aperture 33 so that no "hot" metallic parts are exposed which would be dangerous to personnel.

After the elbow connector 10 is disengaged from the insulating bushing 16, the elbow connector 10 can be engaged with the terminal on a conventional standoff insulator, and thereafter operating personnel may repair and maintain the electrical apparatus in complete safety. The disclosed structure thus provides a visible disconnect.

Operation of latch 58 to the latching position stretches toggle spring 64 and places resilient gasket 69 in compression to provide a seal against entry of moisture into the mating male and female connector portions 36 and 17.

Elbow connector 10 permits reduced dimensions on a transformer enclosure such as a vault or ground level transformer cabinet, provides a visible disconnect, and permits cable grounding.

The disclosed elbow connector 10, with compressed members 50 and 69 providing hermetic seals, is completely weatherproof and capable of direct burial and is submerisible in water. The sealing members 50 and 69 are preferably somewhat compressible silicone rubber which deforms under compression and eliminates air voids between cable conductor and the grounded shield, thereby raising the corona starting voltage and increasing the resistivity of the creepage path between "hot" and grounded metallic parts.

The prefabricated stress relief cone 49 is merely inserted over the cable shield 42 and clamped in electrical engagement therewith by a compression type fitting 55 and forms an extension on the ground shield which prevents concentration of lines of force at the end of the ground shield and substantially eliminates voltage gradients in a direction longitudinal of the connector. The prefabricated stress relief cone 49 eliminates costly and difficult-to-fabricate manually taped stress cones, and the continuous grounded shield reduces the possibility of carbon tracking due to electrical stress and thus eliminates the need for porcelain potheads used in prior art construction. The continuous grounded shield from cable to apparatus and the recessing of all electrically energized parts and the possibility of grounding the cable reduces hazard to workers and makes indoor installation practical.

Although only an elbow type cable connector has been illustrated and described, the invention is not so limited and also comprehends a straight-through connector wherein no bend is provided in body portion 29 and interchange connector 30; it comprehends a disconnectable cable termination wherein interchange connector 30 is eliminated and bayonet 46 mates directly with a receptacle such as 17; it comprehends a disconnectable cable joint wherein receptacle 17 is provided on a member affixed to the conductor of a second shielded cable rather than being on the insulating bushing of an electrical apparatus; and it comprehends reversal of the bayonet and receptacle on the bushing conductor stud 14 and on the interchange connector 30 and also reversal of bayonet 46 and receptacle 40.

FIG. 4 illustrates an embodiment of the invention which terminates a high voltage electrical apparatus insulating bush and has dielectric stress grading means that remove electrical stress from all air in the termination so that no radio noise voltage is generated and deterioration of the insulation cannot occur due to generation of corona. Such insulating bushing may be a second primary bushing on an electrical distribution transformer and may permit future cable connections and also permit testing whether the transformer is energized by means of a glow lamp. The insulating bushing is similar to that described for the embodiment of FIGS. 1–3, the like parts are given similar reference numerals with the addition of the prime designation ('). The termination 70 is not connected to a cable and includes an elongated, cylindrical, hollow body member 71 of suitable conductive material such as aluminum. Body member 71 does not have a right angle bend therein as in the embodiments of FIGS. 1–3 but does have ears 61' having openings for the pivot pin 60' of hookstick latch 58' in a manner identical to the preferred embodiment. A cap member 72 of suitable conductive material such as copper is disposed within hollow body member 71 in radially spaced relation to the inner walls thereof, and a suitable insulating material having high dielectric strength and high surface resistivity such as silicone rubber is poured within body member 71 and cured therein at the factory to form a tubular insulating member 74 between body member 71 and cap member 72. Cap member 72 has a bayonet, or male connector portion, 75 adapted to mate with receptacle 17' on conductive stud 14', and bayonet 75 is split diametrically and has an axial bore 76. A pin 77 of slightly larger diameter than bore 76 fits within bore 76 and resiliently urges bayonet 75 into high pressure engagement with receptacle 17' in the same manner as described for bayonet 36 of the preferred embodiment. Cap member 72 has a reduced diameter portion over which a tubular conductive shield 35' fits, and shield 35' is embedded in tubular insulating member 74 in surrounding relation to the mating connector portions 17' and 75 and defines the axial aperture 33' providing access to bayonet 75 in the same manner as described for the preferred embodiment.

Shield 35' is at the potential of conductive stud 14', while body member 71 is connected to ground through toggle spring 64'. Consequently, the voltage gradients are in a radial direction between shield 35' and grounded body portion 71 and between cap member 72 and body portion 71 through tubular insulating member 74; the equipotential lines of the electrical field are substantially parallel to conductive stud 14' in the straight portion of the termination and follow the arcuate end portion of the termination; and consequently the air within shield 35' is not subject to electrical stress and will not be ionized or give rise to radio noise voltage or generate corona which would initiate deterioration of the insulation.

While only a few embodiments of the invention have been illustrated and described, many modifications and variations thereof will be readily apparent to those skilled in the art, and consequently it is intended in the appended claims to cover all such modifications and variations which fall within the true spirit and scope of the invention.

I claim:

1. In combination with a cable having a conductor surrounded by a layer of insulation terminating back from the end of the conductor and an electrically conductive shield surrounding the layer of insulation and terminating back from the end of the layer of insulation and adapted to be grounded, a cable termination comprising a conductive connector member affixed to said cable conductor, a conductive body member, a conductive inner member disposed within said body member in spaced relation thereto and having a connector portion releasably engaging said connector member and a conductive sleeve portion surrounding said mating connector portion and connector member, a frustoconical conductive hollow stress relief member releasably engaging at its larger diameter end said body member and engaging at its smaller diameter end said cable shield, high dielectric strength insulating material within said body member and disposed between said body member and said inner member including said sleeve portion and also having an annular portion complementary to and disposed within said stress relief member and fitting snugly over said cable insulation, whereby said stress relief and body members form a continuation of said cable shield and electric stress occurs between said body member and said sleeve portion and air adjacent said mating connector member and connector portion is not stressed electrically.

2. Terminating means providing a continuous ground shield and removing electrical stress from air in the termination comprising a tubular conductive body member, a conductive inner member disposed within said body member in radially spaced relation thereto and having a connector portion in alignment with the axis of said body member and a conductive sleeve portion coaxial with said body member and surrounding said connector portion and extending in an axial direction beyond said connector portion, tubular insulating material of high dielectric strength within said body member disposed between said body member and said inner member including said sleeve portion and joining them in a unitary assembly, said sleeve portion and said tubular insulating material defining an axial compartment providing access to said connector portion, and conductive means for connecting said body member to ground, whereby electrical stress exists through said insulating material between said body member and said sleeve portion and the air surrounding said connector portion is not stressed electrically.

3. The combination set forth in claim 2 wherein said terminating means is constructed and arranged to engage the metallic casing of high voltage electrical apparatus, said apparatus including an insulating bushing extending through an opening in said casing, a conductive member extending axially through said bushing and having connecting means exterior of said casing and constructed and arranged to be connected interior of said casing to high voltage electrical apparatus, said connecting means being engageable with said connector portion, said sleeve portion surrounding said connector portion and said connecting means when the latter are in engagement, a means for releasably affixing said terminating means to said casing.

4. The combination set forth in claim 3 and including eye means on said terminating means and engageable by hookstick means to permit disengagement of said connector portion and said connecting means and the removal of said terminating means from said casing.

5. The combination set forth in claim 3 wherein said tubular insulating material has a portion surrounding said connector portion and said connecting means when they are engaged and said means for releasably affixing said terminating means to said casing includes spring means for resiliently urging said body member and said tubular insulating material disposed therein in a direction to compress said material against said bushing and effecting a hermetic seal therebetween.

6. The combination set forth in claim 3 wherein said body member is tubular and open at both ends and said inner member has a second connector portion on an opposite end relative to said first connector portion for being connected to the conductor of a high voltage cable and said tubular insulating material has an axial compartment providing access to said second connector portion through one open end of said housing member and adapted to accommodate the insulation of said cable and wherein said second connector portion is recessed a substantial distance within said axial compartment.

7. The combination set forth in claim 6 and including a high voltage cable having a conductor surrounded by insulation and an outer conductive wrapping terminating back from the end of said insulation and adapted to be connected to ground and also including a frustoconical hollow conductive stress relief member surrounding said cable and being releasably connected at its larger diameter end to said body member adjacent said one open end and connected at its smaller diameter end to said conductive wrapping on said cable, whereby said stress relief member and said body member form a continuation of said conductive wrapping and prevent concentration of lines of electrical force adjacent the end of said conductive wrapping.

8. The combination set forth in claim 6 wherein said conductive body member and said inner member and said insulating material all have elbow bends therein.

9. In combination with a cable having a conductor surrounded by a layer of insulation terminating back from the end of the conductor and electrically conductive shielding means disposed around said layer of insulation and terminating back from the end of the layer of insulation and adapted to be grounded, hollow conductive body means, a conductive inner member disposed within said body means in spaced relation thereto and having conductive connector means releasably engageable with said conductor and conductive shield means disposed in surrounding relation to said connector means, frustoconical hollow stress relief means releasably engaging at its larger diameter end said body member and engaging at its smaller diameter end said cable shielding means, high dielectric strength insulating material disposed between said body means and said conductive inner member including said shield means and also having an annular portion complementary to and disposed within said stress relief means and fitting snugly over said cable insulation, whereby said stress relief and body means form a continuation of said cable shield, and electric stress occurs between said body means and said shield means and air adjacent said connector means is not stressed electrically.

10. The combination set forth in claim 9 wherein said insulating material comprises a first portion disposed within said body means and a second separable portion disposed within said stress relief means, each of said portions having complementary engaging surfaces, and releasable means for attaching said stress relief means to said body means and for forcing said complementary surfaces into high pressure engagement.

11. Terminating means providing a continuous ground shield and removing electrical stress from air in the termination comprising a conductive body member, a conductive inner member disposed within said body member in spaced relation thereto and having a connector portion and conductive shield means electrically connected to said conductive inner member and including a surrounding portion disposed in surrounding relation to and extending beyond said connector portion, insulating means of high dielectric strength within said body member and disposed between said body member and said inner member including said shield means, said surrounding portion and said insulating material defining an axial compartment providing access to said connector portion, and conductive means for connecting said body member to ground, whereby electrical stress exists through said insulating material between said body member and said surrounding portion and the air surrounding said connector portion is not stressed electrically.

12. In combination, a metallic electrical apparatus casing adapted to be grounded, an insulating bushing extending through a wall of said casing, a conductive member protruding axially through said bushing and having a first connector portion at the end thereof exterior said casing and being adapted to be connected to high voltage electrical apparatus interior of said casing, terminating means comprising a hollow conductive outer member, a conductive inner member disposed within said outer member in radially spaced relation thereto and having a second connector portion complementary to and normally releasably engaging said first connector portion, said conductive inner member also including conductive shield means disposed in surrounding relation to said first and second connector portions when the latter are in engagement, high dielectric strength tubular insulating means within said outer member disposed between said inner and outer members and having a portion adjacent said bushing surrounding said first and second connector portions when they are mated, and releasable resilient conductive means engaging said casing and said outer member for urging said outer member in a direction to compress said portion of said tubular insulating means against said bushing to effect a hermetic seal between said bushing and said insulating means, said releasable means normally electrically connecting said casing to said outer member, whereby said outer member is normally grounded and does not present a hazard to personnel.

13. In the combination defined by claim 12 wherein said releasable resilient conductive means comprising spring means including a toggle spring engaging said casing approximately in alignment with the axis of said conductive member and a latch pivotally mounted on said outer member and having an eye engageable by a hotstick and a hook portion engageable with said toggle spring and being pivotable between a latching position wherein said toggle spring is in an overcenter tensioned condition on one side of said axis and said portion of said tubular insulating means is compressed against said bushing to effect a hermetic seal therebetween and a released position wherein said toggle spring is on the other side of said axis and said terminating means may be pulled by said hotstick engaged within said eye away from said bushing.

14. For releasably connecting an electrical cable having a conductor surrounded by a layer of insulation terminating back from the end of the conductor and a conductive shield surrounding the layer of insulation and terminating back from the end of the insulation to an insulating bushing having a protruding conductive member provided with a first connector portion adjacent its end; an elbow connector comprising a hollow outer conductive member having a bend therein and being open at both ends and having an eye portion engageable with a hotstick, a conductive interchange member disposed within said outer member in radially spaced relation thereto and having a bend therein and a second connector portion at one end complementary to and adapted to releasably engage said first connector portion and a third connector portion at its opposite end adapted to accommodate a connector member affixed to said cable conductor, annular insulating material within said outer member disposed between said inner and outer members and joining them in a unitary assembly and defining an axial compartment through which said third connector portion is accessible, the portion of said outer member circumjacent said axial compartment having threads thereon, a hollow frustoconical conductive stress relief member coaxial with said compartment and adapted to fit over said cable and having a tubular portion at its smaller diameter end adapted to overlie said cable shield, means engaging said threads for releasably connecting said larger diameter end of said stress relief member to said outer member, said annular insulating material having a portion complementary to and disposed within said stress relief member, and a conductive sleeve member electrically connected to said inner member and surrounding one of said connector portions at the ends of said inner member and being surrounded by said annular insulating material, whereby electrical stress exists through said insulating material between said sleeve and said outer member and air adjacent said one conector portion within said sleeve member is not stressed electrically.

References Cited

UNITED STATES PATENTS

| 2,177,268 | 10/1939 | Stone et al. | 339—143 |
| 2,352,481 | 6/1944 | Hyland | 339—91 X |
| 2,498,250 | 2/1950 | Cole | 339—91 X |
| 2,625,579 | 1/1953 | Frazee | 174—77 |
| 3,033,915 | 5/1962 | Huston | 174—19 X |
| 3,092,290 | 6/1963 | Hoelle | 339—177 X |

FOREIGN PATENTS

| 1,046,902 | 7/1953 | France. |
| 1,241,785 | 4/1960 | France. |
| 398,076 | 9/1933 | Great Britain. |

MARVIN A. CHAMPION, *Primary Examiner.*

PATRICK A. CLIFFORD, *Examiner.*